Patented Apr. 27, 1948

2,440,543

UNITED STATES PATENT OFFICE 2,440,543

RECOVERY OF CATALYST FROM MIXTURES OF HYDROCARBONS THEREWITH IN THE LIQUID PHASE

Everett C. Hughes, Cleveland Heights, Ohio, assignor to The Standard Oil Company, Cleveland, Ohio, a corporation of Ohio No Drawing. Application April 27, 1944, Serial No. 533,050

20 Claims. (Cl. 23—205)

This invention relates to the separation of inorganic fluorides, such as hydrogen fluoride and boron trifluoride from hydrocarbons. More particularly, the invention relates to the removal and/or recovery of such fluorides from a physical mixture or a chemical combination thereof with hydrocarbons.

Inorganic fluorides, and in particular hydrogen fluoride and boron trifluoride, have been proposed for use either separately or in a mixture as a catalyst in a number of hydrocarbon reactions. While these fluorides function well as a catalyst, they are soluble to a certain extent in some of the hydrocarbons. It is desirable that the final hydrocarbon products should be relatively free from fluorides, not only because it is desirable to recover and reuse the fluorides, but also because such hydrocarbon products may be less desirable for their ultimate use if contaminated with fluorides. It is also desirable that aromatics and unsaturates, which accumulate in the liquid fluoride catalyst phase and deactivate the same, should be separated so as to recover the fluorides from this phase for reuse, as well as to recover the hydrocarbons in an unmodified or degraded form. The hydrocarbons which are present in the catalyst phase are thought to be in the form of a loose chemical combination with the fluorides referred to as a complex.

It is an object of the invention to treat hydrocarbons containing fluorides, or vice versa, in which the fluorides are in chemical combination or physical admixture wtih the hydrocarbons, so as to separate the fluorides from the hydrocarbons and recover the fluorides.

It is an additional object of the invention to remove fluorides from the hydrocarbon products, particularly the more saturated type, such as gasolines, kerosenes, fuel oils, and heavier hydrocarbon products in which the fluorides may be dissolved.

A further object of the invention is to separate fluorides from a fluoride-hydrocarbon chemical complex, such as is formed in a liquid phase catalytic hydrocarbon process, so that the fluorides may be recovered and made available for reuse as a catalyst.

An additional object of the invention, particularly in connection with the above-mentioned recovery of fluorides from the fluoride-hydrocarbon complex, is to recover the fluorides with a minimum modification or degradation of the hydrocarbons in the complex.

It is also an object of the invention to utilize a separating or recovering medium, which may be referred to as an absorbent, which is not soluble in the hydrocarbons nor miscible or reactive therewith, so that the treated hydrocarbons do not contain a detectable amount of the absorbent.

An additional object of the invention is the use of such an absorbent which does not deteriorate upon use and which may be reused.

More particularly, it is an object of the invention to employ as separating mediums oxyfluoboric acids as these are defined hereinafter, and preferably one which is referred to as boron trifluoride dihydrate.

A further object of the invention is to separate the fluorides from hydrocarbons under conditions of temperature and pressure convenient to employ in connection with the catalytic hydrocarbon treating process.

Still a further object of the invention is to recover the fluorides from the absorbent under such conditions, particularly under pressures, normally used in connection with the hydrocarbon treating process.

An object of the invention that is of particular significance is to provide a continuous process which does not use up the catalyst or the absorbent so that additional supplies of raw materials are not required other than the hydrocarbon being treated.

The invention is applicable to the separation and recovery of inorganic fluorides in general, particularly hydrogen fluoride and boron trifluoride, because these have been proposed more extensively as catalysts. The invention will be described as applicable to the recovery of a mixture of a major amount of hydrogen fluoride and a minor amount of boron trifluoride in the liquid phase. This is described merely as illustrative and not as a limitation on the application of the invention to the recovery of either fluoride separately or a mixture of them in other proportions or under other conditions.

Hydrogen fluoride boils at about 67° F. and is therefore a liquid at temperatures just under room temperature. It may be retained in the liquid phase at higher temperatures by means of moderate pressures. The temperatures and pressures used in the catalytic treatment of hydrocarbons are conveniently those which maintain the hydrogen fluoride in the liquid phase.

Boron trifluoride boils at −150° F. and is a gas at the temperatures and pressures that are conveniently employed in catalytic hydrocarbon processes. However, boron trifluoride is soluble in liquid hydrogen fluoride to a given extent and the amount which dissolves at any particular temperature depends upon the partial pressure of the boron trifluoride. At higher partial pressures larger amounts of boron trifluoride are dissolved. Thus the composition of a catalyst comprising the two fluorides, i. e., their relative proportions, may be regarded as a function of the amount of boron trifluoride dissolved in the hydrogen fluoride and this in turn is a function of the partial pressure of the boron trifluoride. By varying the partial pressure of the boron trifluoride, the activity of the catalyst and the rate and nature of the reaction may be controlled. The use of the words "dissolved" and "soluble" with reference to the relation of the two fluorides is intended as generic to both a physical admixture and a reaction product.

The hydrogen fluoride and boron trifluoride used may be the available commercial grades. It is not necessary to have chemically pure fluorides. The impurities in the commercial grades including water, which are generally present in an amount of ¼ to 5 per cent, do not interfere with the operation of the catalyst.

It has been found that a wide variety of hydrocarbon reactions may be catalyzed by means of hydrogen fluoride in the liquid phase in which boron trifluoride is dissolved. These processes include, among others, isomerization, cracking of higher hydrocarbons alone or in the presence of butane, averaging a higher and lower molecular weight hydrocarbon to produce one of intermediate molecular weight, alkylating isoparaffins or aromatics with olefins, polymerization, various combinations of the above, and other processes involving a change in the chemical configuration or the molecular weight of the hydrocarbons.

In addition, such a mixture of fluorides may be used as an extractive agent to selectively separate aromatics, unsaturates and sulfur-containing compounds or any mixture of them from other hydrocarbons as described in Patents Nos. 2,343,744 and 2,343,841. In these processes the fluorides seem to act in the nature of an extraction, but for convenience of terminology the liquid hydrogen fluoride in which boron trifluoride is dissolved will be referred to as a catalyst irrespective of the exact type of action that takes place when the hydrocarbons are treated therewith.

In general, these hydrocarbon treating processes are carried out by subjecting the hydrocarbons, with at least a portion of them in the liquid phase, to a liquid material comprising liquid hydrogen fluoride in which boron trifluoride is dissolved. The order in which the various materials and the ingredients of the catalyst are brought together is not critical and need not be described in detail as this is not a part of the invention. Depending upon the chemical nature and molecular weight of the hydrocarbon raw materials, and the reaction conditions selected, the hydrocarbons will be catalytically modified, such as isomerized, cracked, polymerized, averaged, alkylated, etc., or aromatics may be removed as described in Patent No. 2,343,744, or other actions or reactions may take place depending upon the hydrocarbons treated and the conditions. The treatment is generally carried out by agitating the hydrocarbons and the liquid fluorides, preferably in an intimate state of admixture, and preferably also in one or more stages of treatment. It may be a continuous or batch operation. The action is continued for the desired length of time, depending upon the conditions selected and the products wanted. The action may be carried out in the presence of an olefin which acts as a promoter, and may also be carried out in the presence of hydrogen.

The temperature of the treatment may be varied over a wide range, depending upon the reaction and other conditions and in general may vary from about −30° to 400° F. The partial pressure of the boron trifluoride, and therefore the relative proportions of the two fluorides, may vary from about 5 to 550 pounds per square inch. Under most conditions of temperature this will mean that the amount of the hydrogen fluoride is in excess of the amount of boron trifluoride when expressed in mols. The total pressure preferably is sufficient to retain the hydrogen fluoride in the liquid phase at the temperature employed and may vary up to several thousand pounds per square inch. However, high pressures are not required. The amount of the liquid catalyst may vary from 1 to 300 volume per cent based on the hydrocarbon. The time of contact between the hydrocarbon and the catalyst may vary with other factors and is selected with reference to optimum yields of the desired products.

The temperature, composition of the fluorides, the amount of fluorides, the time of contact and other factors mentioned heretofore are more or less interdependent. The ranges referred to are not intended to mean that any temperature may be used with any length of time, or any composition of the catalyst, to obtain the identical result. The temperature selected generally will be with reference to the desired equilibrium point in the reaction, provided the reaction rate is sufficiently great at this temperature. If a lower temperature is used, comparable results may be obtained by using a somewhat larger amount of catalyst or a somewhat higher partial pressure of boron trifluoride, or a longer treating time, or any or all of them. The action may be controlled readily by varying the partial pressure of the boron trifluoride. The conditions selected will be primarily those which accomplish the desired action in a minimum of time under pressure and temperature conditions that are economical to employ.

At the conclusion of this treatment, the fluorides for the most part are comprised in what is referred to as a liquid catalyst phase. The liquid hydrocarbon phase and the catalyst phase will stratify into two layers, if permitted to come to a quiescent state. Alternatively, they may be separated by forces greater than gravity, such as by centrifugal force. The catalyst phase is the heavier and separates as the lower layer if the separation is accomplished by means of gravity. Reference to "lower layer" generally refers to liquid fluoride catalyst containing the fluoride-hydrocarbon complex. The separation of the two layers preferably is made under the pressure of the system or the pressure may be released and any fluorides or hydrocarbon evolved may be recovered. It is convenient to make the separation under pressure and to treat at least the lower layer in accordance with the invention while under the pressure of the system. The lower layer may be reused before treatment in accordance with the invention, and the upper layer may be fractionated and a part returned to the reaction zone.

The upper layer or a fraction thereof, which contains the hydrocarbons, which have been modified, dearomatized, etc., may contain a small amount of the fluorides dissolved therein. This is undesirable in a motor fuel or lubricant, for example, because it may have a deleterious effect upon the motor or may involve health hazards. It is difficult to remove the fluorides by distillation inasmuch as they form constant boiling mixtures with some hydrocarbons. It has been proposed to remove fluorides by treating with bauxite, but this is an expensive processing operation and in many instances does not result in the complete or satisfactory removal of the fluorides.

The lower layer contains at least part of the unsaturates or aromatics. It is believed that they probably form a loose chemical complex with the fluorides. The hydrocarbons in the catalyst phase tend to deactivate the fluorides and also cause this phase to build up in volume, especially if an additional amount of fluorides is introduced to maintain the desired activity either in dearomatizing or in a catalytic modifying process. Although the catalyst phase containing hydrocarbons may be reused, eventually its activity decreases in such reuse to a point where it is not economic to employ it further. It is desirable to be able to recover the fluoride constituents from this lower layer for reuse. It has been possible to do this by heating the catalyst phase whereupon the fluorides are volatilized and may be condensed or repressured for further use. During such heating operation, if it is carried to a point where substantially all of the fluorides are eliminated, the hydrocarbons tend to polymerize or otherwise become degraded by the high temperature so as to be of less value. It is desirable, therefore, to separate the fluorides completely without subjecting the lower layer to high temperatures, so that the hydrocarbons contained therein may be of greater value.

The formation of the lower layer becomes more of a problem in processes where the feed stock contains aromatics because these are separated in the lower layer. Inasmuch as the accumulation of hydrocarbons in the lower layer deactivates the fluorides, this tends to interfere with the efficiency and utility of the process. This is not objectionable, provided the fluorides can be recovered efficiently from the hydrocarbon and reused. The loss of the hydrocarbons which are transferred into the lower layer is important economically, but this is not of so much significance provided these hydrocarbons can be recovered in a form in which they can be utilized to advantage. However, previous methods of separating the fluorides, which have involved the use of high temperatures, tend to degrade the hydrocarbon to such an extent that they are of little, if any, economic value. Under such circumstances the loss of hydrocarbons in the lower layer may be one of the paramount economic factors.

The above referred to processes are not strictly a part of this invention, but are included in order to describe the materials to which the invention is applicable and the problems which the invention solves.

In accordance with the invention the said lower layer or the upper layer, or both, may be treated after their separation from each other, or before their separation, with an oxyfluoboric acid. This operation may be carried out under pressure conditions generally used in the hydrocarbon treating process so as not to require extensive repumping. The temperatures conveniently may be near those used in the hydrocarbon treating process so as not to occasion heat losses nor to degrade the hydrocarbons. The process is preferably carried out with thorough mixing of the layer and the oxyfluoboric acid since the operation involves essentially that of contacting an oxyfluoboric acid with all of the fluorides in association with the hydrocarbon. This may be done in one or more stages. Generally if a plurality of stages are employed a smaller amount of an oxyfluoboric acid can be used to accomplish a complete extraction. For example, if the total amount of an oxyfluoboric acid to be used is divided in half, and the fluoride-containing hydrocarbon is treated first with one half of said acid and then with the other half, it is thought that a smaller total amount of the oxyfluoboric acid could be used than in a single treatment. The process also contemplates the use of a plurality of stages in which an oxyfluoboric acid is passed countercurrent to the hydrocarbon.

After the contact treatment, the mixture can be stratified into layers and fluoride-freed hydrocarbon may be separated as one layer, and the oxyfluoboric acid used in which the fluorides have become absorbed as the other layer.

The oxyfluoboric acid containing the fluorides, after separation from the hydrocarbons, may be transferred to a desorbing or fluoride liberating zone, and upon the application of heat, the fluorides will be desorbed or liberated and may be condensed, repressured or otherwise stored or reused. Inasmuch as the absorption of the fluorides generates heat, provision should be made in the absorption zone to keep the temperature down to the desired operating level. Since the desorption or liberation requires heat, this must be supplied to the liberation zone. This can be done through a suitable heat exchanger.

It is an important aspect of the process that the fluorides may be liberated at the same pressure as that used in their absorption, and this may be the pressure under which the catalytic process is operating. The oxyfluoboric acid, may be reused after liberation, and in a continuous process it may be cooled and immediately returned to the absorption zone.

The absorption or liberation may be carried out in the presence of hydrogen, especially when fluorides are being separated from the lower layer, with a view to hydrogenating the unsaturates or minimizing polymerization.

When the invention is adapted to a continuous process, and the oxyfluoboric acid is repeatedly circulated from the absorbing to the liberating zone, its exact composition will probably be dependent on the temperature and pressure under which the absorbing and liberating operations are carried out. It may also vary depending upon contact with water which may be introduced with the hydrocarbon feed stock.

When the process of the invention is applied to the treatment of an upper layer, i. e., a hydrocarbon containing a small amount of fluorides dissolved therein, the oxyfluoboric acid will extract the fluorides from the hydrocarbon. Inasmuch as the oxyfluoboric acid containing the absorbed fluorides is immiscible with the hydrocarbon, the fluoride-free hydrocarbon can be separated in one phase and the hydrocarbon-free oxyfluoboric acid can be separated as the other phase.

When the process of the invention is applied to the treatment of the lower layer, the exact action may depend somewhat on the constitution of the lower layer and the type of process in which it was formed. When the lower layer is formed in the removal of aromatics and the lower layer is treated with oxyfluoboric acid, the aromatics will separate as one phase and the oxyfluoboric acid will separate as another phase. They are mutually insoluble in each other and the aromatics can be recovered free from fluorides and the oxyfluoboric acid. The oxyfluoboric acid and the absorbed fluorides can then be treated to liberate the fluorides.

When the lower layer has been formed as a result of a more drastic catalytic treatment with the fluoride catalyst, not all of the hydrocarbon may be separated from the catalyst phase in the first treatment. For example, if the lower layer is formed as the result of cracking an aromatic-containing stock the lower layer will contain the aromatics and also other hydrocarbons in the form of a complex. Upon treatment of this lower layer with oxyfluoboric acid the aromatics will be separated more readily as one phase. Some of the hydrocarbons that are bound more closely in the complex may not be separated at first and may remain in the oxyfluoboric acid phase. After the amount of hydrocarbons builds up in the oxyfluoboric acid phase during its cycles through the absorption and liberation zones the hydrocarbons will be separated more readily. Also as the oxyfluoboric acid is heated in the liberation zone the hydrocarbons in said acid may be modified so as to be separated more readily from the oxyfluoboric acid.

In another embodiment of the process the hydrocarbon upper layer can be treated with an oxyfluoboric acid to remove the fluorides from the hydrocarbon. Inasmuch as the amount of fluorides to be so removed will usually not be great, the oxyfluoboric acid will not have its fluoride absorbing capacity exhausted and it can then be used to treat a lower layer catalyst phase before being liberated. Thus two absorptions can be obtained in a single cycle of the oxyfluoboric acid.

The amount of the oxyfluoboric acid absorbent to be used in separating the fluorides will depend primarily upon the amount of the fluoride present in admixture or chemical combination with the hydrocarbons. The amount preferably should be sufficient under the temperature and pressure conditions in the absorbing zone to absorb and remove all of the fluorides. There is no disadvantage in using more than the minimum amount necessary to remove the fluorides since the oxyfluoboric acid is insoluble in the hydrocarbons. This indicates that there is no upper limit to the amount that may be used. However, there is no advantage technically nor economically in using more than is necessary.

Inasmuch as the upper layer generally will contain but a small amount of fluorides dissolved therein, it is possible to use a relatively small amount of an oxyfluoboric acid in removing fluorides from the hydrocarbons constituting the upper layer. In general, amounts as low as 5 volume per cent may be used unless some unusual condition or factor is present. In general, amounts within the range of 2 to 20 volume per cent should prove adequate to insure complete removal under all conditions.

In treating the lower layer the amount of an oxyfluoboric acid generally will be much larger since the fluorides in the lower layer may comprise the principal constituent. If the catalyst phase has been reused many times and consists of a large portion of hydrocarbon, lesser amounts need be used. If the catalyst phase contains only a small amount of hydrocarbon, a larger quantity of an oxyfluoboric acid should be used.

The amount used will also depend on the character of the complex in the lower layer. The amount to be used also may depend somewhat upon whether the separation is accomplished in a single stage or a plurality of stages, and also upon the temperature. In general the amount should be within the ranges of 25 to 250 volume per cent, but the amount can be readily determined by one skilled in the art, in view of the explanation herein as to the factors to be considered in determining it. There is no point in using an excess since this involves only the losses incident to the handling, heating and cooling of the excess absorbent.

The temperature of the absorption should be relatively low and preferably not above 200° F. In general, the range of 70° to 150° is suitable. The temperature of the liberation must be above that of the absorption if the pressures are the same, but not above the boiling point of the oxyfluoboric acid used. The wider the temperature differential between absorption and liberation, the greater will be the amount of fluorides recovered per pass of the absorbent. It is preferred to employ a liberation temperature fairly near the boiling point of the oxyfluoboric acid used. In the case of boron trifluoride dihydrate a temperature of between 315° and 330° F. is preferred at atmospheric pressure.

The pressure may be the same or different for the absorption and liberation. It is simple to operate the absorption and liberation under the same pressure, which is the same as the pressure under which the catalytic hydrocarbon treating process is operated, so that there is no need to repump the recovered fluorides into the catalyst process. It is an advantage of the invention that the stripping of the fluorides can be accomplished at pressures as high as 300 pounds per square inch. The pressure, however, may be any pressure below this, including subatmospheric pressures, if desired.

The oxyfluoboric acids which are used as the extractant or absorbent may be represented by the general formula $H_xB_yF_zO_w$, where $x$, $y$, $z$ and $w$ are the whole small numbers. Hydrogen, fluoride, boron and oxygen form a series of oxygen-containing fluoboric acids which vary in composition depending upon the temperature, pressure, and materials with which they are in contact. An example of such an acid is dihydroxyfluoboric acid having the formula $H_3BF_2O_2$ which may be prepared by the action of boron trifluoride on boric acid or the action of hydrogen fluoride on boric oxide.

Another example of an oxyfluoboric acid results from the reaction of dihydroxyfluoboric acid with one mol of hydrogen fluoride to form a compound of the general formula $H_4BF_3O_2$ or $BF_3.2H_2O$ which, for want of a better recognized name, will be referred to as boron trifluoride dihydrate.

Another compound within this series results from the action of boron trifluoride on water and has the formula $H_6B_2F_6O_3$ or $BF_3.1\frac{1}{2}H_2O$.

These different oxyfluoboric acids may shift from one to the other with the liberation or absorption of hydrogen fluoride, boron trifluoride, water, boric acids or oxides, etc., depending upon the materials within which they are in contact and their relative amounts, probably dependent somewhat upon the law of mass action, as well as upon the temperature and pressure. Under certain conditions a plurality of such oxyfluoboric acids may exist in admixture.

The above oxyfluoboric acids, upon being contacted with inorganic fluorides, such as hydrogen fluoride or boron trifluoride, separately or in admixture, form addition compounds with such fluorides under appropriate conditions of temperature and pressure. The addition products probably can be regarded as other members in the series of oxyfluoboric acids. For example, when dihydroxyfluoboric acid is contacted with hydrogen fluoride, boron trifluoride or a mixture thereof, the fluorides become absorbed in the acid, particularly at relatively lower temperatures. When said acid and the absorbed fluorides are transferred to a liberating zone and the temperature elevated, boron trifluoride and hydrogen fluoride are given off. It is important to note, however, that while all of the absorbed boron trifluoride may thus be liberated from dihydroxyfluoboric acid, one mol of the hydrogen fluoride is not liberated and is retained resulting in the compound $H_4BF_3O_2$. This material has a boiling point at 334–345° F. and is to be distinguished from dihydroxyfluoboric acid. It may be used to further absorb and liberate hydrogen fluoride, boron trifluoride or a mixture thereof.

The initial material may be formed in any manner known in the art and probably can be formed from boron trifluoride, water, and hydrogen fluoride. Thus, if desired, it can be built up in the process by introducing controlled amounts of water in the catalytic or recovery processes.

As illustrative of an application of the invention, an upper hydrocarbon layer, resulting from the cracking of the portion of a crude oil below 550° F. with liquid fluoride containing dissolved boron trifluoride, was washed with 25 volume per cent of dihydroxyfluoboric acid for the purpose of recovering fluorides contained in the hydrocarbon. The hydrocarbon so treated was then washed with a weak caustic and the fluoride content of the caustic was determined. This procedure gives a measure of any fluorine left in the hydrocarbon. The sample showed 0.0002% fluorine. Inasmuch as this is right at the limit of accuracy of the analytical method, it is justifiable to assume that all the detectable fluorine is extracted from the hydrocarbon by means of the dihydroxyfluoboric acid.

As illustrative of the results that may be obtained with the treatment of the catalyst phase lower layer, a straight run naphtha was isomerized at 150° F. with 100 volume per cent of liquid hydrogen fluoride containing boron trifluoride dissolved in an amount to provide a partial pressure of boron trifluoride of 150 pounds per square inch. The naphtha was treated with the catalyst for thirty minutes and the catalyst phase was separated after the isomerization and was reused to treat twelve different batches of naphtha in a semi-continuous operation. 218 grams of the catalyst phase from the above isomerization were poured into a Monel pot containing 300 cc. of dihydroxyfluoboric acid. The pot was cooled in an ice bath and the catalyst phase was added slowly enough to prevent undue fuming from the mouth of the pot. The mixture was shaken vigorously and permitted to stratify. 24 grams of hydrocarbon were isolated, the remainder being the liquid dihydroxyfluoboric acid phase containing the absorbed fluorides.

In another example, employing a smaller amount of dihydroxyfluoboric acid as an absorbent, the catalyst phase from the above referred to isomerization was treated with 50% by weight of dihydroxyfluoboric acid. The hydrocarbon separated was analyzed for fluorine and found to have a fluorine content of 0.0004%, which is at about the limit of accuracy of analysis, thereby indicating the completeness with which the dihydroxyfluoboric acid extracts the fluorides from the hydrocarbons. The dihydroxyfluoboric acid containing the absorbed fluorides was hydrolyzed and was not found to contain any hydrocarbon whatever. This shows the completeness with which the hydrocarbons are separated.

As further indicative of the amount of the fluorides that may be absorbed and liberated per pass, portions of a lower layer catalyst phase were treated with dihydroxyfluoboric acid at 90° F. to absorb the fluorides from the catalyst phase. The fat absorbent was heated to a temperature of 266° F. to liberate the fluorides. After liberation said acid was used to reabsorb an additional quantity of fluorides from a further quantity of the same lower layer catalyst and the acid was reused in six such cycles in a continuous process. The overall average amount of fluorides recovered per cycle are as follows:

Hydrogen fluoride\_\_\_mol/per mol of acid\_\_ 0.381
Boron trifluoride\_\_\_\_mol/per mol of acid\_\_ 0.502

In the above continuous operation, it will be appreciated, as explained heretofore, that the dihydroxyfluoboric acid is changed to a different compound in the first cycle because not all of the hydrogen fluoride is liberated, and that the absorbent recycled through the last five cycles is thought to boron trifluoride dihydrate.

An adaptation of the invention which may be important from the commercial standpoint, would be to heat the lower layer fluoride-hydrocarbon complex to distill therefrom a portion of the fluorides at a temperature sufficiently low so as not to degrade the hydrocarbons. If such distillation is to be carried out at the pressure of the system, it is not possible to remove all of the fluorides without going to temperatures which would cause coking of the unsaturates in this phase. In such an adaptation of the invention the lower layer may be heated at system pressure, such as 250 pounds per square inch at a temperature of 230° to 270° F. and a part of the fluorides liberated and recovered. The lower layer could then be treated with an oxyfluoboric acid to recover the remainer of the fluorides.

It will be appreciated that the commercial applicability of the use of fluorides as catalysts depends to a large extent upon the ability to produce a hydrocarbon product relatively free from fluorides and to recover the fluorides sufficiently for reuse. By means of the process of the invention it is possible to accomplish this desideratum in an efficient, simple and convenient manner.

The reference to absorb and absorption is intended to cover a phenomenon in which the action is chemical or physical or both. The reference to liberate and liberation is intended to cover a physical or chemical action or both.

In practicing the process it will be obvious that many variations in material, procedural steps, conditions, etc. may be effected as will occur to one skilled in the art, and I intend all of the same to be included within my invention as are included in the following claims:

I claim:

1. A method of separating fluorides from hydrocarbons which comprises contacting a fluoride-hydrocarbon composition in the liquid phase with an oxyfluoboric acid and absorbing the inorganic fluoride in the oxyfluoboric acid to separate the inorganic fluoride from the liquid hydrocarbon, and separating the hydrocarbon from the oxyfluoboric acid absorbent and absorbed fluoride.

2. A method of separating hydrogen fluoride from hydrocarbons which comprises contacting a hydrogen fluoride-hydrocarbon composition in the liquid phase with an oxyfluoboric acid and absorbing the hydrogen fluoride in the oxyfluoboric acid to separate the hydrogen fluoride from the liquid hydrocarbon, and separating the hydrocarbon from the oxyfluoboric acid absorbent and absorbed fluoride.

3. A method of separating boron trifluoride from hydrocarbons, which comprises contacting a boron trifluoride-hydrocarbon composition in the liquid phase with an oxyfluoboric acid and absorbing the boron trifluoride in the oxyfluoboric acid to separate the baron trifluoride from the liquid hydrocarbon, and separating the hydrocarbon from the oxyfluoboric acid absorbent and absorbed fluoride.

4. A method of separating hydrogen fluoride and boron trifluoride from hydrocarbons, which comprises contacting a fluoride-hydrocarbon composition in the liquid phase with an oxyfluoboric acid and absorbing simultaneously the hydrogen fluoride and the boron trifluoride in the oxyfluoboric acid to separate the hydrogen fluoride and the boron trifluoride from the liquid hydrocarbon, and separating the hydrocarbon from the oxyfluoboric acid absorbent and absorbed fluoride.

5. A method of removing fluorides from a hydrocarbon processed with an inorganic fluoride, which comprises contacting said hydrocarbon in the liquid phase with an oxyfluoboric acid and absorbing in the oxyfluoboric acid any of said inorganic fluoride dissolved in the liquid hydrocarbon, and separating the hydrocarbon from the oxyfluoboric acid absorbent and absorbed fluorides.

6. A method of removing hydrogen fluoride from a hydrocarbon processed with hydrogen fluoride, which comprises contacting said hydrocarbon in the liquid phase with an oxyfluoboric acid and absorbing in the oxyfluoboric acid any of the hydrogen fluoride dissolved in the liquid hydrocarbon, and separating the hydrocarbon from the oxyfluoboric acid absorbent and absorbed fluorides.

7. A method of removing boron trifluoride from a hydrocarbon processed with boron trifluoride, which comprises contacting said hydrocarbon in the liquid phase with an oxyfluoboric acid and absorbing in the oxyfluoboric acid any of the boron trifluoride dissolved in the liquid hydrocarbon, and separating the hydrocarbon from the oxyfluoboric acid absorbent and absorbed fluorides.

8. A method of removing hydrogen fluoride and baron trifluoride from a hydrocarbon processed with both hydrogen fluoride and boron trifluoride, which comprises contacting said hydrocarbon in the liquid phase with an oxyfluoboric acid and absorbing in the oxyfluoboric acid any of the hydrogen fluoride and boron trifluoride dissolved in the liquid hydrocarbon, and separating the hydrocarbon from the oxyfluoboric acid absorbent and absorbed fluorides.

9. A process of separating fluorides from a liquid fluoride phase containing hydrocarbons in the form of a fluoride-hydrocarbon complex and resulting from the treatment of hydrocarbons with an inorganic fluoride, which comprises contacting said liquid fluoride and hydrocarbon containing phase with an oxyfluoboric acid and absorbing the inorganic fluoride in the oxyfluoboric acid to separate the inorganic fluoride from the liquid hydrocarbon, and separating the hydrocarbon from the oxyfluoboric acid absorbent and absorbed fluorides.

10. A process of separating fluorides from a liquid fluoride catalyst phase containing hydrocarbons including aromatics in the form of a fluoride-hydrocarbon complex and resulting from the treatment of hydrocarbons with a liquid catalyst comprising hyrdogen fluoride containing boron trifluoride, which comprises contacting said liquid catalyst phase with an oxyfluoboric acid and absorbing the hydrogen fluoride and the boron trifluoride in the oxyfluoboric acid to separate the hydrogen fluoride and the boron trifluoride from the liquid hydrocarbon, and separating the hydrocarbon from the oxyfluoboric acid absorbent and absorbed fluorides.

11. A method of recovering an inorganic fluoride which comprises contacting a hydrocarbon and inorganic fluoride containing composition in the liquid phase with an oxyfluoboric acid to absorb at least a part of said fluoride, separating said oxyfluoboric acid containing the absorbed fluoride and heating the same to liberate at least a part of said fluoride therefrom.

12. A method of recovering hydrogen fluoride and boron trifluoride which comprises contacting a composition comprising a hydrocarbon and said fluorides in the liquid phase with an oxyfluoboric acid to absorb simultaneously at least a part of both of said fluorides, separating said oxyfluoboric acid containing the absorbed fluorides and heating the same to liberate at least a part of the hydrogen fluoride and boron trifluoride therefrom.

13. A method of recovering hydrogen fluoride and boron trifluoride which comprises contacting a composition comprising aromatics and said fluorides in the liquid phase with an oxyfluoboric acid to absorb simultaneously at least a part of both of said fluorides and separate the aromatics, separating said oxyfluoboric acid containing the absorbed fluorides and heating the same to liberate at least a part of the hydrogen fluoride and boron trifluoride therefrom.

14. A method of recovering an inorganic fluoride which comprises contacting a hydrocarbon and inorganic fluoride containing composition in the liquid phase with an oxyfluoboric acid in an absorbing zone to absorb at least part of the fluoride, withdrawing said oxyfluoboric acid and absorbed fluoride from the absorbing zone to a fluoride liberating zone, removing the fluoride from said oxyfluoboric acid in said liberating zone, and returning the denuded oxyfluoboric acid to the absorbing zone.

15. A method of recovering hydrogen fluoride and boron trifluoride from a liquid catalyst phase containing hydrocarbons in the form of a fluoride-hydrocarbon complex and resulting from the treatment of hydrocarbons with liquid hydrogen fluoride containing boron trifluoride, which comprises contacting said liquid catalyst phase with an oxyfluoboric acid in an absorbing zone to absorb said fluorides, withdrawing said oxyfluoboric acid and absorbed fluorides from the absorbing zone to a fluoride liberating zone, removing the fluorides from said oxyfluoboric acid in said liberating zone, and returning the denuded oxyfluoboric acid to the absorbing zone.

16. A method of recovering an inorganic fluoride from a hydrocarbon material containing said fluoride as a result of a process of treating a hydrocarbon with said fluoride; which method comprises contacting said hydrocarbon and fluoride containing material in the liquid phase with an oxyfluoboric acid in an absorbing zone at a temperature at which said fluoride is absorbed in said oxyfluoboric acid, transferring said oxyfluoboric acid in which the fluoride is absorbed to a fluoride liberating zone, liberating the fluoride by heating to a temperature higher than in the absorbing zone, and returning the denuded oxyfluoboric acid to the absorbing zone to absorb the fluoride from an additional quantity of the hydrocarbon and fluoride containing material.

17. A method of recovering any hydrogen fluoride and boron trifluoride contained in a hydrocarbon material as a result of a process of treating a hydrocarbon with said fluorides; which method comprises contacting said hydrocarbon material in the liquid phase with an oxyfluoboric acid in an absorbing zone at a temperature at which said fluorides are absorbed in said oxyfluoboric acid, transferring said oxyfluoboric acid in which the fluorides are absorbed to a fluoride liberating zone, liberating the fluorides by heating to a temperature higher than in the absorbing zone, and returning the denuded oxyfluoboric acid to the absorbing zone to absorb the fluorides from an additional quantity of said hydrocarbon material.

18. A method of recovering hydrogen fluoride and boron trifluoride from a liquid catalyst phase containing said fluorides in the form of a fluoride-hydrocarbon complex as a result of treating said hydrocarbon with liquid hydrogen fluoride containing boron trifluoride; which method comprises contacting said liquid catalyst phase with an oxyfluoboric acid in an absorbing zone at a temperature at which said fluorides are absorbed in said oxyfluoboric acid, transferring said oxyfluoboric acid in which the fluorides are absorbed to a fluoride liberating zone, liberating the fluorides by heating to a temperature higher than in the absorbing zone, and returning the denuded oxyfluoboric acid to the absorbing zone to absorb the fluorides from an additional quantity of the liquid catalyst phase.

19. A method of recovering hydrogen fluoride and boron trifluoride from a liquid catalyst phase containing said fluorides in the form of an aromatic-fluoride complex as a result of treating an aromatic containing hydrocarbon with liquid hydrogen fluoride containing boron trifluoride; which method comprises contacting said liquid catalyst phase with an oxyfluoboric acid in an absorbing zone at a temperature at which said fluorides are absorbed in said oxyfluoboric acid and said aromatics are separated, transferring said oxyfluoboric acid in which the fluorides are absorbed to a fluoride liberating zone, liberating the fluorides by heating to a temperature higher than in the absorbing zone, and returning the denuded oxyfluoboric acid to the absorbing zone to absorb the fluorides from an additional quantity of the liquid catalyst phase.

20. A method of recovering hydrogen fluoride and boron trifluoride from a composition comprising said fluorides and a hydrocarbon as a result of a process of treating a hydrocarbon with liquid hydrogen fluoride containing boron trifluoride; which method comprises contacting said liquid catalyst phase with boron trifluoride dihydrate in an absorbing zone at a temperature at which said fluorides are absorbed, transferring said boron trifluoride dihydrate in which the fluorides are absorbed to a fluoride liberating zone, liberating the fluorides by heating to a temperature higher than in the absorbing zone, and returning the denuded boron trifluoride dihydrate to the absorbing zone to absorb the fluorides from an additional quantity of the liquid catalyst phase.

EVERETT C. HUGHES.

REFERENCES CITED

The following references are of record in the file of this patent:

UNITED STATES PATENTS

| Number | Name | Date |
|---|---|---|
| 2,148,115 | Gerhart et al. | Feb. 21, 1939 |
| 2,160,570 | Loder | May 30, 1939 |
| 2,196,363 | Robertson | Apr. 9, 1940 |
| 2,282,712 | Engs et al. | May 12, 1942 |
| 2,284,554 | Beyerstedt | May 26, 1942 |